United States Patent [19]
Powers

[11] Patent Number: 5,335,817
[45] Date of Patent: Aug. 9, 1994

[54] PAPER FILTER DISPENSER

[76] Inventor: Ernest G. Powers, P.O. Box 192, Clermont, Ga. 30527

[21] Appl. No.: 72,883

[22] Filed: Jun. 7, 1993

[51] Int. Cl.⁵ .............................................. B65H 3/00
[52] U.S. Cl. ...................................... 221/43; 221/46; 221/197; 221/259; 221/281
[58] Field of Search ...................... 221/43, 42, 49, 33, 221/45, 46, 277, 259, 231, 197, 186, 287, 282, 174, 281; 220/319, 320; 271/121, 124

[56] References Cited
U.S. PATENT DOCUMENTS

| | | | |
|---|---|---|---|
| 2,434,454 | 1/1948 | Breitwieser | 221/43 |
| 2,639,959 | 5/1953 | Couden | 221/43 |
| 2,714,469 | 8/1955 | Carlson | 220/320 |
| 4,662,536 | 5/1987 | Powers | 221/43 |
| 5,050,737 | 9/1991 | Joslyn et al. | 221/49 |

Primary Examiner—Kenneth W. Noland
Attorney, Agent, or Firm—Jason A. Bernstein

[57] ABSTRACT

An improved sealed dispenser for sequentially dispensing filters utilizing a band tangentially contacting a portion of the periphery of a wheel thereby providing a frictionalized surface. Filters may be added to the top of the dispenser in a prepackaged set and the packaging becomes a sealing top to the dispenser. A single filter can be drawn from a stack of filters positioned in the dispenser by rotating the wheel using an externally attached knob, which passes a single filter by friction between the wheel and the band. The filter exits the dispenser via a pivotably closable door located at the lower part of the front of the dispenser.

3 Claims, 3 Drawing Sheets

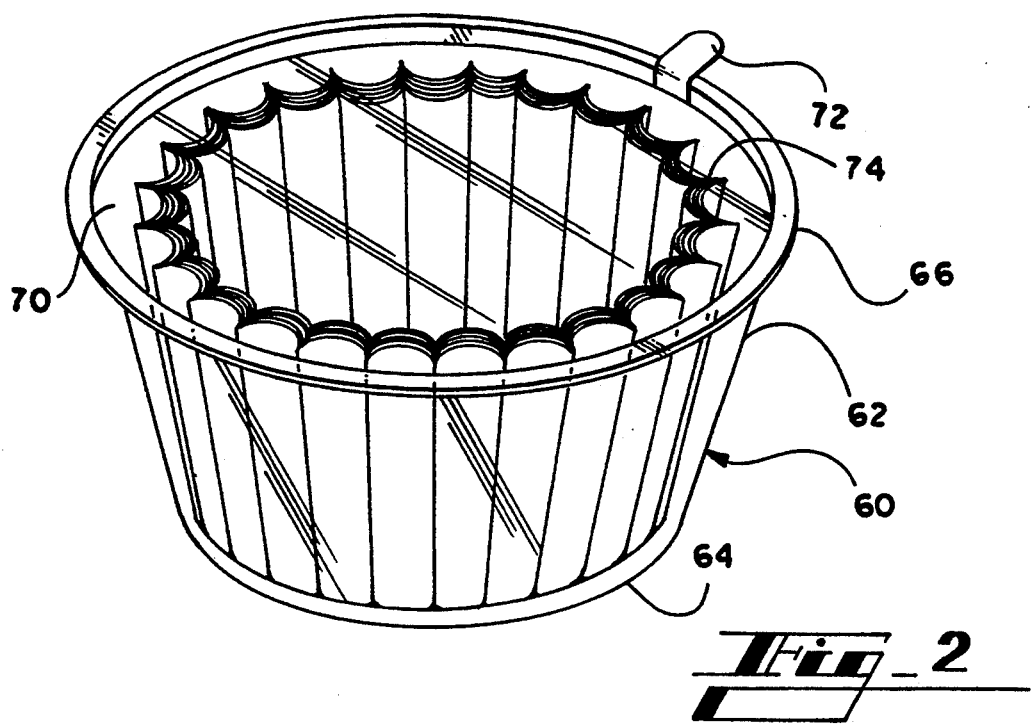
Fig_2
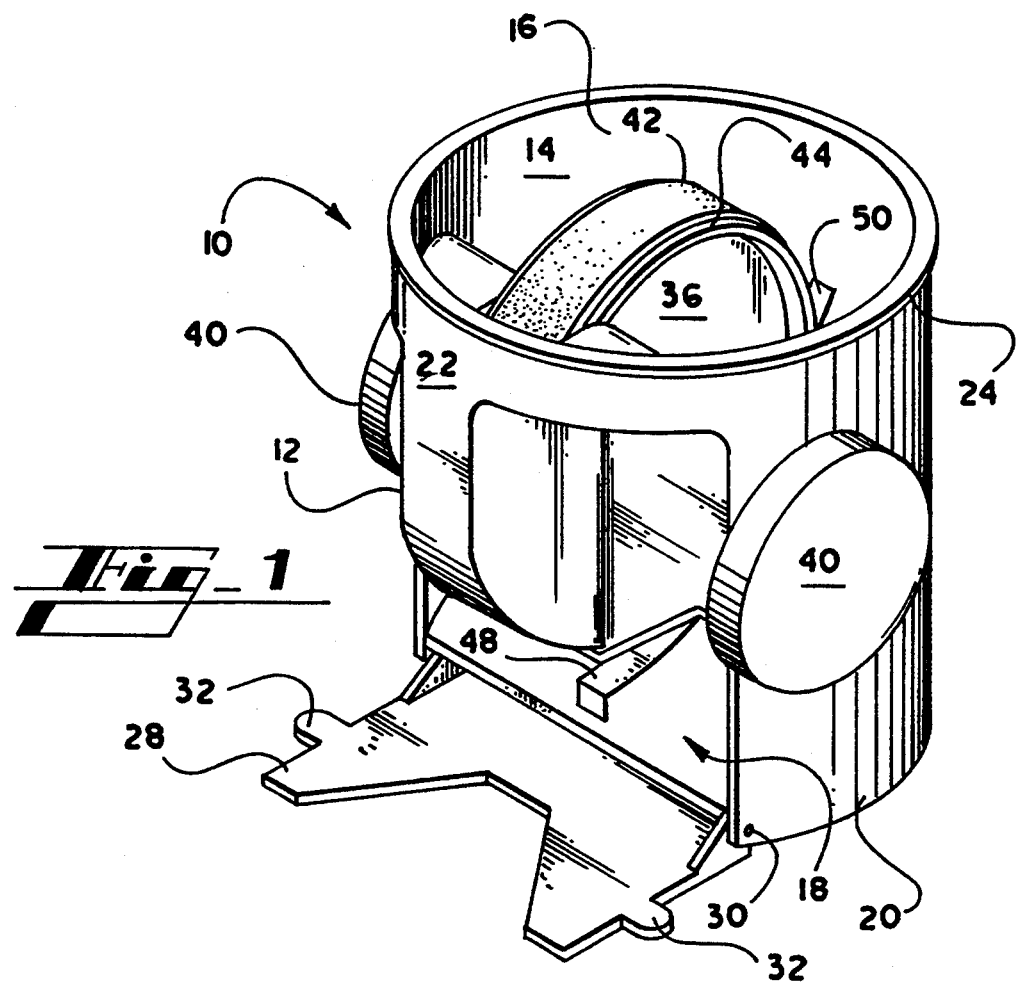
Fig_1

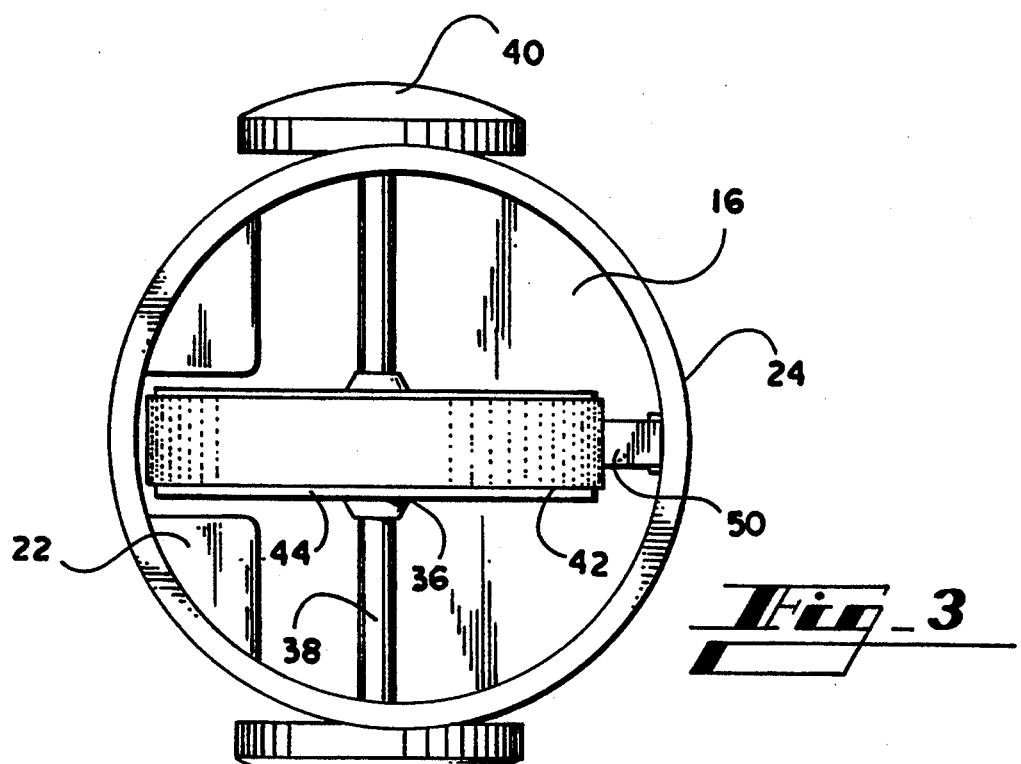
Fig_3
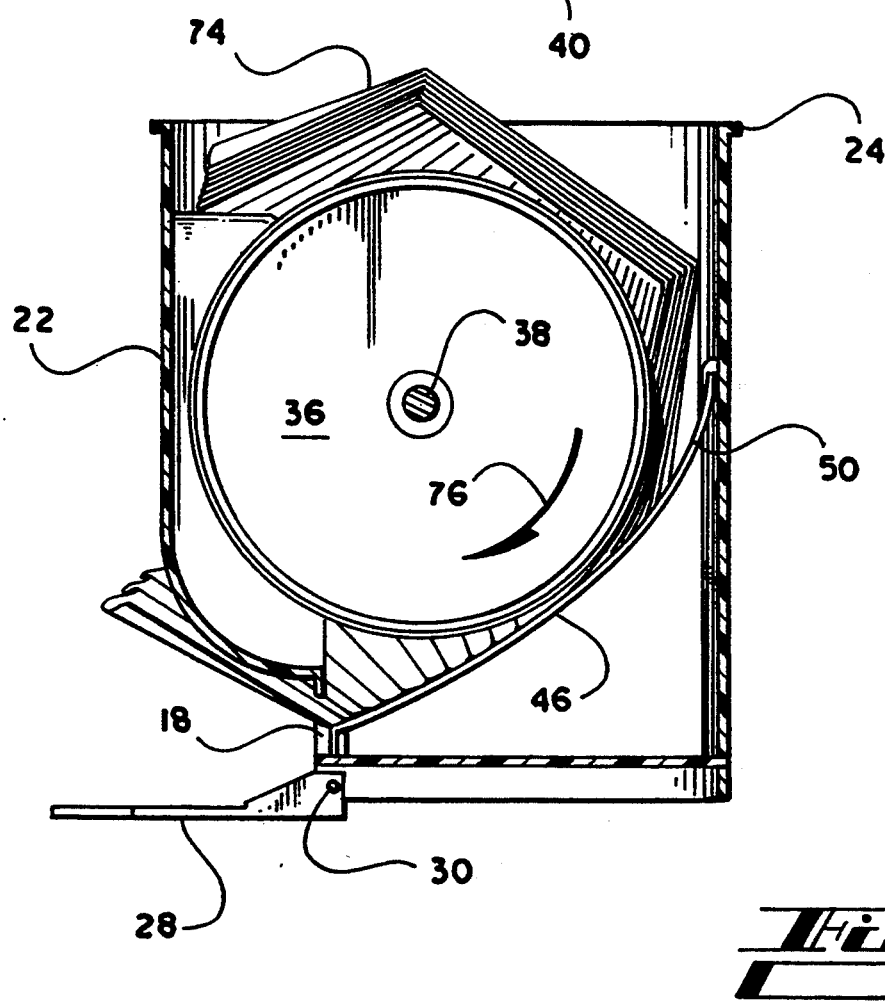
Fig_6

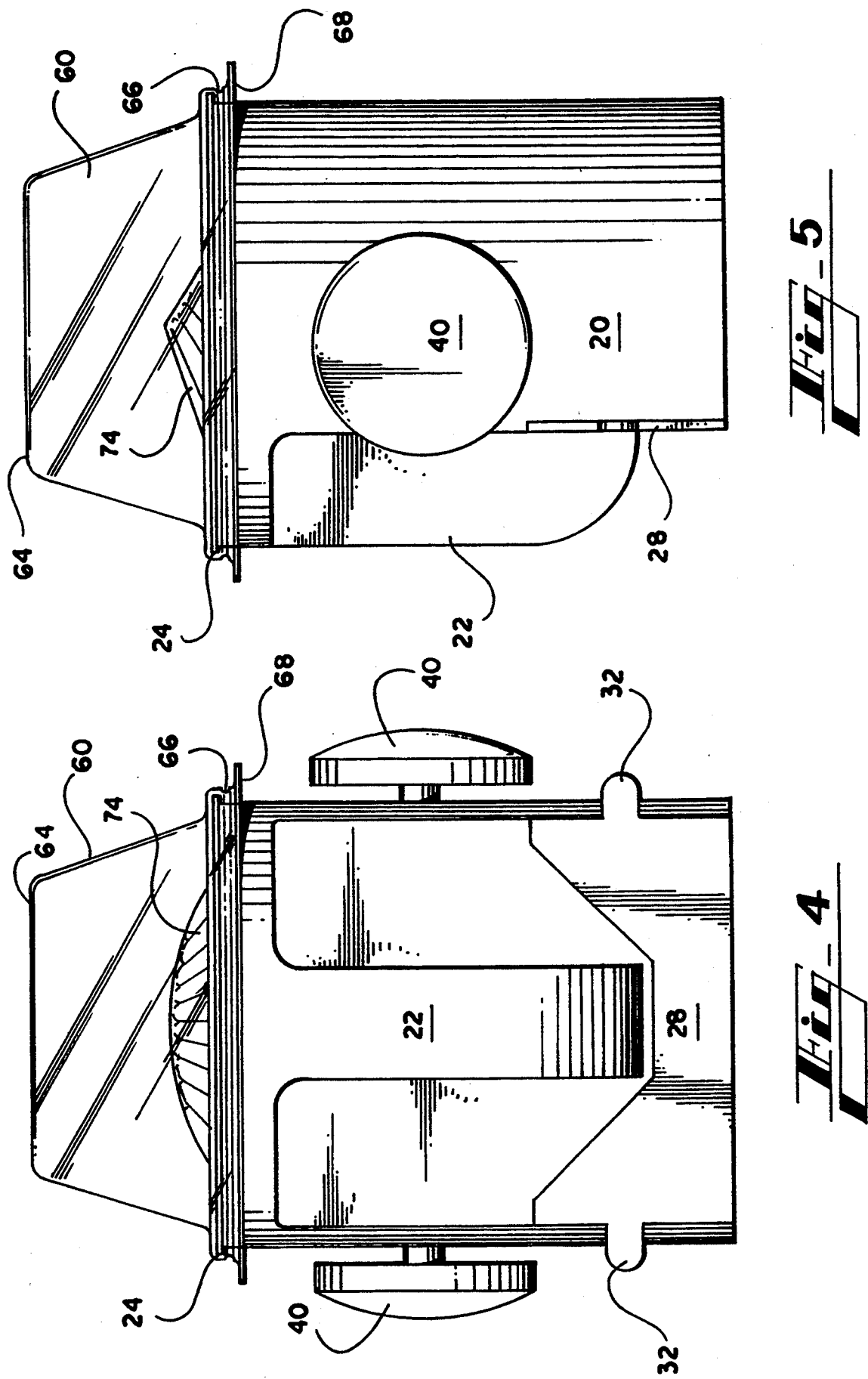

PAPER FILTER DISPENSER

FIELD OF THE INVENTION

The present invention relates to dispensing apparatus and more particularly to an improved apparatus for dispensing paper filters one at a time.

BACKGROUND OF THE ART

The present invention is an improvement to my prior invention disclosed in U.S. Pat. No. 4,662,536, which is incorporated by reference in its entirety herein.

In today's environment, people have a greater sensitivity to cleanliness. Health regulations rate requiring new levels of operating procedures in restaurants and other food service businesses to ensure clean service and a minimum of human contact. With the proliferation of communicable diseases and the perceived threat of AIDS, people are more critical of the establishments they attend.

Many smaller restaurants have coffee making machines in full view of their patrons. In a busy restaurant one can often see an employee manually placing a coffee filter from a stack into a container or manually placing a single filter into a coffee pot. Such manual contact may cause concern for some customers. Additionally, since filters often are difficult to separate digitally, when in a hurry a user may wind up licking or otherwise wetting their fingers to provide enough friction to separate the filters.

Restaurants are environments typically having a great deal of moisture from steaming foods, tea and coffee pots and dish washing apparatus in the vicinity. Such moisture can contain bacteria, other microorganisms, airborne contaminants, and the like, which can be absorbed by the filter. It would be desirable to have a filter dispenser that could be loaded from the top using a sealed "cartridge" or pack containing prepackaged filters. Such a dispenser would then substantially reduce or eliminate hand contact with the filters. My previous invention did not have a way to load the apparatus from the top, nor did it allow for addition of a set of prepackaged filters without using one's hands. Furthermore, my previous invention was not a sealed box; rather, it had an opening which might better off have been closable.

It is therefore a principal object of the present invention to provide an improved apparatus for dispensing single filters from a pack so as to minimize human contact with the filters.

It is a further object of the present invention to provide a filter dispenser having a removable top that contains a sealable pack of filters that can be provided in a prepackaged form and can be unsealed and loaded in the dispenser with substantially no hand contact with the filters themselves.

It is an additional object of the present invention to provide a filter dispenser that is substantially sealable from external contamination by dust and other agents when not in use.

SUMMARY OF THE INVENTION

The present invention provides an improved filter dispenser comprising a housing having a top opening with a circumferential lip, a front portion having an exit opening, side portions, rear portion and bottom portion; a friction wheel mounted on an axle having a first end and a second end mounted within the housing for rotary movement; a drive means in mechanical communication with the axle for rotating the wheel; a means contacting the wheel for providing a friction passageway comprising a band mounted in the housing with a portion of the band in contact with the friction wheel; and a removable container top having a bottom and a top, the container being removably mountable on the top opening by engaging the lip.

The invention also utilizes a drop down door that remains closed when not in use and opens to permit exit of individual filters. A pair of knobs on either side of the outside of the housing permit a user to rotate the friction wheel with either hand to urge a filter out of the dispenser.

BRIEF DESCRIPTION OF THE DRAWINGS

FIG. 1 shows a perspective view of a preferred embodiment of the dispenser of the present invention.

FIG. 2 shows a perspective view of a container used with the dispenser of the present invention.

FIG. 3 shows a top plan view of the present invention with the container removed.

FIG. 4 shows a front elevational view of the present invention.

FIG. 5 shows a side elevational view of the present invention.

FIG. 6 shows a cutaway side view of the present invention with a set of filters within the housing.

DESCRIPTION OF THE PREFERRED EMBODIMENTS

Referring to the drawings in which like numerals describe like parts throughout the several figures, FIG. 1 shows a dispenser 10 having a housing 12 with an inner wall 14, a top opening 16, an exit opening 18, sides 20 and a front portion 22. The housing 12 can be molded of plastic or made or any other suitable rigid material. The housing 12 is generally cylinder shaped, but variations on the shape are possible and contemplated by the present invention. The top opening 16, as shown in FIG. 3, has a circumferential lip 24 surrounding the opening.

The exit opening 18 is located toward the bottom portion of the front portion 22. The opening 18 is covered by a door 28. The door 28 is mounted on two pivots 30 attached to the sides 20 of the housing 12. Optionally, the door 28 can have one or more side tabs 32 located on either side to facilitate opening of the door. The door 28 can be maintained in a closed position by a protrusion 34 (not shown) extending downward from the top of the exit opening 18, over which the door 28 can be urged by a user. When the door 28 is closed dirt and other contaminants are prevented from entering the dispenser 10.

Turning to the interior of the dispenser, FIGS. 1, 3 and 6 show a friction wheel 36 mounted with its axis horizontal (i.e., parallel to the top and bottom portions) for rotary movement within the housing 12. The wheel 36 has an axle 38 that extends though two bearing holes formed in the two sides 20. The terminus of the axle 38 is connected to one, and preferably two, turning knobs 40 positioned on each side of the housing 12 substantially as shown in FIGS. 4 and 5. The annular periphery 44 of the wheel is provided with a high friction rubber annulus 42 that has a substantially flat peripheral surface. The annulus 42 provides traction to grip material contacting the wheel 36. The annulus 42 can be a rubber band separately made and removably assembled with the wheel 36, or a rubberized surface adhered to the wheel surface to form a permanent part of the wheel.

The dispenser 10 is further seen to include a resilient band 46, of somewhat smaller width than the annular wheel periphery 44. The band 46 has a front end portion 48 of a relatively low friction surface and a rear end portion 50 of a relatively high friction surface. The band 46 is preferably molded of plastic and forms a part of the molded housing 12. Alternatively, the band 46 can be a separate piece and molded of plastic or made of metal or the like and attached by a fastening means to the housing 12. The rear end portion 50 is mounted in slidable, spring biased contact against the inside surface of the inner wall 14. The length of the band 46 is such as to position a mid-portion of it in contact with the rubber annulus 42 of the friction wheel 36, as shown in FIG. 6. The top end of the portion of the band 46 is at the elevation of the interior part of the bottom area of the housing 12, or slightly above it.

FIG. 2 shows a removable top container 60 which comprises a generally frustum-shaped plastic piece having a top opening 62 and a bottom 64. The container 60 is preferably molded of plastic or metal, but can be made of any suitable substance. The top opening 62 has a flanged rim or lip 66 projecting radially outward around the circumference of the opening 62. A portion 68 of the flanged rim 66 is curved slightly inward to provide an expandably engagable seal which can detachably fit around the outer lip 24 of the dispenser housing 12. The opening 62 is sealed by a generally flat pull-off lid 70, having a pull tab 72 for easy removal. The lid 72 is joined to the inner rim of the container opening 62 by sonic welding, fusion, adhesion or the like. The container 60 can be manufactured so as to be open initially at the top. A predetermined number of nested filters 74 are placed in the container 60. The lid 70 is placed over the top opening 62 and then affixed to the container 60. In this manner the filters 74 are placed in a sealed, contaminant-free environment until ready for use.

In use, a prepackaged container 60 having a stack of filters 74 is taken and the lid 70 removed using the pull-tab 72 to expose the filters 74. The container with the filters is then upended and the top 62 of the container is placed down over the lip 24 of the dispenser 10. The filters 74 drop down over the wheel 36 in their nested condition and are in position to be singly dispensed. A user need only open the door 28 using either or both of the side tabs 32 and then turn either of the knobs 40 in the direction of the arrow 76 (see FIG. 6) which causes the wheel 36 to rotate toward the rear portion 50 of the band 46. A single filter 74 is drawn from the stack by frictional engagement between the resilient band 46 and the rubber annulus 42 when the wheel 36 is turned.

The knobs 40 on either side 20 permit use by either hand. Circular knobs 40 permit the user to turn the wheel 36 without substantially moving the housing 12, which is advantageous when the dispenser 10 it not mounted to a surface. This is more beneficial than a hand crank rod, which may require two hands to use if the unit is not mounted to a wall or other surface.

In a restaurant having much activity and food, the present invention is advantageous because it prevents contamination of the filters by providing a closed container.

The present invention can be readily adapted to use types of nested or stacked objects other than coffee filters, such as, but not limited to, hospital face masks, paper plates, napkins, cups, or bowls, feminine hygiene pads, other paper goods, and the like. In essence, any objects which are relatively thin, flat, and stackable can be used. The shape of the housing or the wheel can be modified to accommodate various shaped objects, such as square, oblong or cup-shaped, not just circular or conical. Such modifications are considered to be within the scope of the present invention.

It is also within the scope of the present invention to include an electric motor in place of the manual knob 40 in order to turn the friction wheel 36. The motor would be mounted within the dispenser 10 in mechanical communication and controlled by a switch on the front 22 or side 20 portions. The motor could be controllable so that it would rotate a portion of a rotation sufficient to grip a single filter 74 and motivate it through the exit opening 18. A coffee pot could be positioned underneath to catch the filter. This would automate the dispensing process. Such motors, switches and controllers are known in the art and are commercially available.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

I claim:

1. A dispenser for dispensing individual filters from a stack of filters, comprising:

a housing having a top opening with a circumferential lip, a front portion having an exit opening, side portions, a rear portion and a bottom portion;

a friction wheel mounted on an axle having a first end and a second end mounted within said housing for rotary movement;

a drive means in mechanical communication with said axle for rotating said wheel;

a means contacting said wheel for providing a friction passageway comprising a band mounted in said housing with a portion of said band in contact with said friction wheel;

said top opening capable of associating with a removable container top having a bottom, a top, comprising a removable sealing flap, said container containing a prepackaged set of removable filters said container being removably mountable on said top opening by engaging said lip.

2. In a dispenser for sequentially dispensing filters from a stack of filters, having a housing with an opening; a friction wheel mounted for rotary movement within said housing; drive means for rotating said friction wheel; and a band mounted within said housing with a portion of said band in contact with said friction wheel, said band having a relatively low friction surface extending from adjacent said housing opening through said wheel contact portion and a relatively high friction surface extending beyond said wheel contact portion on which a stack of filters may be set within said housing, the improvement comprising said housing having a top opening with a circumferential lip; a removable top containing a prepackaged set of filters, said top having a removable sealing cover, said top being engagable with said lip to provide a seal to prevent moisture and contaminants from entering said dispenser, whereby when said removable top is mounted on said lip said set of filters is positioned on said friction wheel for individual dispensing.

3. The improved dispenser of claim 2, further comprising a pivotable door in said housing covering said exit opening, said door being mounted in said housing by a pair of hinges, said door providing a seal when in a closed position to prevent entry of contaminants into said dispenser and permitting exit of filters when in an open position, said open and closed positions being set by a user.

* * * * *